United States Patent
Hiebl

(10) Patent No.: US 8,682,067 B2
(45) Date of Patent: Mar. 25, 2014

(54) METHOD FOR ENTROPY-BASED DETERMINATION OF OBJECT EDGE CURVES

(75) Inventor: Manfred Hiebl, Sauerlach (DE)

(73) Assignee: EADS Deutschland GmbH, Ottobrunn (DE)

(*) Notice: Subject to any disclaimer, the term of this patent is extended or adjusted under 35 U.S.C. 154(b) by 314 days.

(21) Appl. No.: 13/202,246

(22) PCT Filed: Feb. 9, 2010

(86) PCT No.: PCT/DE2010/000147
§ 371 (c)(1),
(2), (4) Date: Oct. 27, 2011

(87) PCT Pub. No.: WO2010/097069
PCT Pub. Date: Sep. 2, 2010

(65) Prior Publication Data
US 2012/0033877 A1 Feb. 9, 2012

(30) Foreign Application Priority Data
Feb. 19, 2009 (DE) .......................... 10 2009 009 572

(51) Int. Cl.
*G06K 9/00* (2006.01)

(52) U.S. Cl.
USPC ........................................................ 382/165

(58) Field of Classification Search
USPC ................................................. 382/165, 173
See application file for complete search history.

(56) References Cited

U.S. PATENT DOCUMENTS

| | | | |
|---|---|---|---|
| 5,375,177 A * | 12/1994 | Vaidyanathan et al. | 382/291 |
| 5,448,652 A * | 9/1995 | Vaidyanathan et al. | 382/165 |
| 6,665,439 B1 * | 12/2003 | Takahashi | 382/199 |
| 6,901,163 B1 * | 5/2005 | Pearce et al. | 382/165 |
| 6,944,331 B2 * | 9/2005 | Schmidt et al. | 382/165 |
| 7,671,898 B2 * | 3/2010 | Chiba | 348/222.1 |
| 2002/0041705 A1 * | 4/2002 | Lin et al. | 382/165 |
| 2003/0035580 A1 * | 2/2003 | Wang et al. | 382/176 |
| 2004/0037460 A1 * | 2/2004 | Luo et al. | 382/165 |
| 2006/0268344 A1 * | 11/2006 | Shiau | 358/3.22 |

OTHER PUBLICATIONS

Akira Shiozaki, "Edge Extraction Using Entropy Operator," Academic Press, Inc., 1986, Computer Vision, Graphics, and Image Processing, 1986, pp. 1-9, vol. 36.

(Continued)

*Primary Examiner* — Jingge Wu
(74) *Attorney, Agent, or Firm* — Crowell & Moring LLP

(57) ABSTRACT

In a method for determining object edge curves in a recorded image of a multispectral camera, the image recorded is converted into a false color image, hue value from the HSV color space is assigned to each pixel in the false color image such that the hue value corresponds to a hue angle on a predetermined color circle, and the pixels are classified as object pixels and background pixels, such that those pixels with hue values that are within a predetermined value range are defined as the object pixels. An entropy profile is then determined by way of a displaceable evaluation window, such that the entropy of mixing S is calculated for each pixel from the object pixels and background pixels according to the equation:

Figure 2:
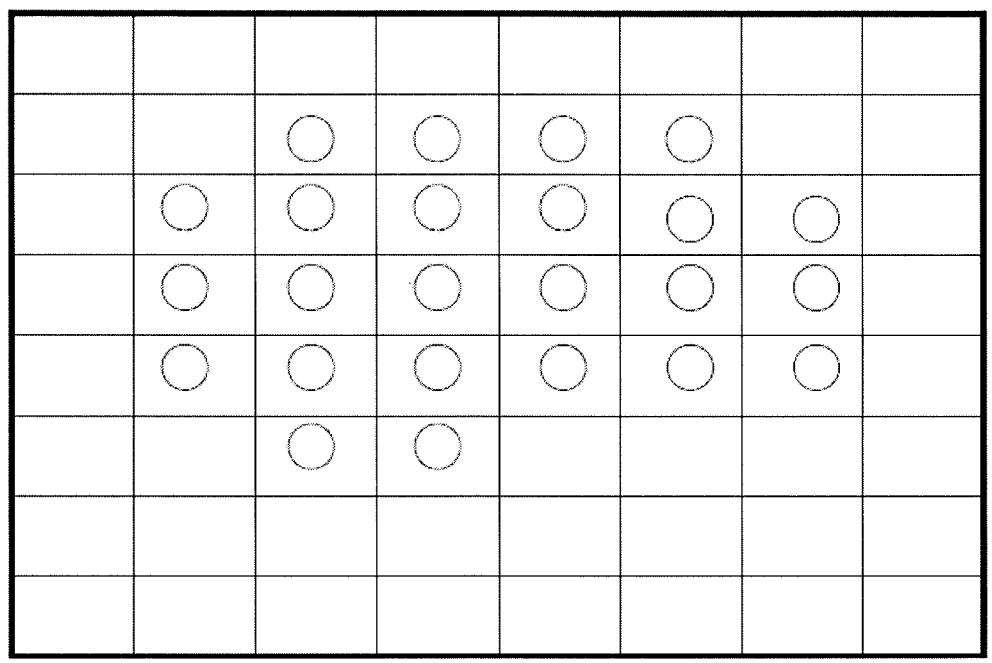

$$S = -k\left(n_A \ln\frac{n_A}{n_A + n_B} + n_B \ln\frac{n_B}{n_A + n_B}\right)$$

where $n_A$ denotes the number of object pixels within the evaluation window, $n_B$ denotes the number of background pixels within the evaluation window and k is a proportionality factor.

2 Claims, 5 Drawing Sheets

(56) References Cited

OTHER PUBLICATIONS

H. D. Cheng et al. "Color Image Segmentation: Advances and Prospects," Pattern Recognition, Elsevier, Dec. 1, 2001, pp. 2259-2281, vol. 34, No. 12, XP004508355.

Wenzhan Dai et al., "An Image Edge Detection Algorithm Based on Local Entropy," Integration Technology, IEEE International Conference on, IEEE, Mar. 1, 2007, pp. 418-420, XP031127292.

Wen Furong et al., "An Novelty Color Image Edge Detector Based on Fast Entropy Threshold," Proceedings of IEEE Tencon'02, IEEE Region 10 Conference on Computers, Communications, Control and Power Engineering Proceedings, Oct. 28-31, 2002, pp. 511-514, vol. 1, XP010628535.

S. Makrogiannis et al., "Scale Space Segmentation of Color Images Using Watersheds and Fuzzy Region Merging," Proc. 2001, International Conference on Image Processing, Oct. 7, 2001, pp. 734-737, vol. 1, XP 010564964.

C. F. Sin et al., "Image Segmentation by Edge Pixel Classification with Maximum Entropy," Intelligent Multimedia, Video and Speech Processing, Proceedings of 2001 International Symposium on May 2-4, 2001, pp. 283-286, XP010544718.

German Office Action dated Oct. 2, 2009 (Three (3) pages).

International Search Report including English language translation dated Jun. 18, 2010 (Eleven (11) pages).

PCT/ISA/237 Form (Eight (8) pages).

* cited by examiner

| 1 | 350 | 301 | 216 | 228 | 342 | 356 | 1 |
|---|---|---|---|---|---|---|---|
| 353 | 245 | 19 | 192 | 191 | 192 | 336 | 2 |
| 332 | 199 | 193 | 196 | 19 | 193 | 194 | 1 |
| 336 | 197 | 192 | 188 | 181 | 189 | 191 | 7 |
| 348 | 198 | 195 | 196 | 179 | 180 | 173 | 9 |
| 359 | 241 | 194 | 188 | 172 | 157 | 19 | 6 |
| 0 | 357 | 355 | 344 | 6 | 355 | 4 | 5 |
| 2 | 2 | 5 | 0 | 1 | 3 | 2 | 3 |

Fig. 1

| 0 | 3,74 | 6,02 | 7,72 | 9,00 | 7,72 | 6,03 | 3,74 |
|---|---|---|---|---|---|---|---|
| 3,74 | 9,72 | 9,94 | 10,97 | 11,09 | 10,97 | 9,94 | 7,72 |
| 6,03 | 9,94 | 11,09 | 9,94 | 9,00 | 9,94 | 11,09 | 9,94 |
| 7,72 | 10,97 | 9,94 | 3,74 | 0 | 6,03 | 10,59 | 6,03 |
| 7,72 | 10,97 | 9,94 | 6,03 | 10,59 | 9,00 | 11,09 | 9,94 |
| 6,03 | 9,94 | 11,09 | 6,03 | 10,59 | 11,09 | 9,94 | 7,72 |
| 3,74 | 7,72 | 9,94 | 10,59 | 6,02 | 9,00 | 6,03 | 3,74 |
| 0 | 3,74 | 6,03 | 6,03 | 6,03 | 3,74 | 0 | 0 |

Fig. 4

METHOD FOR ENTROPY-BASED DETERMINATION OF OBJECT EDGE CURVES

BACKGROUND AND SUMMARY OF THE INVENTION

This invention relates to a method for entropy-based determination of object edge curves in a recorded image of a multispectral camera.

It is known that the average information content of an image is characterized by entropy. The entropy value provides information about the minimum number of bits required to store the pixels of an image. This value also provides information about whether a reduction in the required storage space can be achieved without any loss of information.

From the article by A. Shiozaki: "Edge Extraction Using Entropy Operator"; Academic Press Inc. 1986; Computer Vision, Graphics, and Image Processing, 1986, vol. 36, pages 1-9, it is known that entropy operators may be used for object edge detection in images.

Methods which utilize entropy in image processing of images recorded by air-to-surface means are known from the state of the art; edge trackers are one example. With an edge tracker, the image to be sought is examined for parallel edges. The search is terminated when the edge strength drops below a preselectable threshold. With this method it is possible to detect streets and roads. The disadvantage of this method is that it yields good results only with such objects that have a fixedly outlined object contour.

The problem addressed by the present invention is to provide a method for determining object edge curves.

This problem is solved with the features claimed. Advantageous embodiments are also claimed.

According to the invention, a method for detection and classification of objects in a recorded image includes converting the image recorded into a false color image, assigning a hue value from the HSV color space to each pixel in the false color image, such that the hue value corresponds to a hue angle H on a predetermined color circle, and classifying each pixel as one of an object pixel and background pixel, such that the pixels whose hue values are within a predetermined value range are defined as the object pixels. An entropy profile (FIG. 5) is determined by way of a displaceable evaluation window, such that the entropy of mixing S is calculated for each pixel in the recorded image from the object pixels and background pixels according to the equation $$S = -k\left(n_A \ln\frac{n_A}{n_A + n_B} + n_B \ln\frac{n_B}{n_A + n_B}\right)$$

where nA denotes the number of object pixels within the evaluation window, nB denotes the number of background pixels within the evaluation window and k is a proportionality factor, and differentiation and extreme value consideration of the entropy profile determined is performed.

In processing images recorded by air-to-surface means, a distinction is made between artificial and natural objects. Monochromatic objects can be defined by assigning a certain hue to them. Polychromatic objects can be defined as the sum of multiple monochromatic objects. The method according to the invention can be used in classification of monochromatic objects, i.e., those of a single color, as well as polychromatic objects, i.e., those of multiple colors.

The starting image material in modern multispectral cameras is in the form of RGB images (RGB=red, green, blue). In addition many cameras also have one more color available, which is in the infrared spectrum and is referred to as IR. Since the true color has little informational value because of what is known as color mix-up (a painted green automobile could not be differentiated from a green field on which it is parked) it must be transformed to another color space to enable this differentiation, i.e., the so-called HSV space (HSV=hue (color), S=saturation, V=volume (brightness)). There are several different methods with which those skilled in the art are familiar for this conversion, but the results are equivalent.

Invariance of the hue with respect to fluctuations in brightness forms an important difference between the representation of color and hue; whereas the color color changes because of changes in lighting conditions, the hue remains unchanged over a wide range, so that an object can be located again on the basis of the hue (H), even after a certain period of time has elapsed.

The present invention and advantageous embodiments are explained in greater detail below on the basis of the drawing figures.

Figure 3:
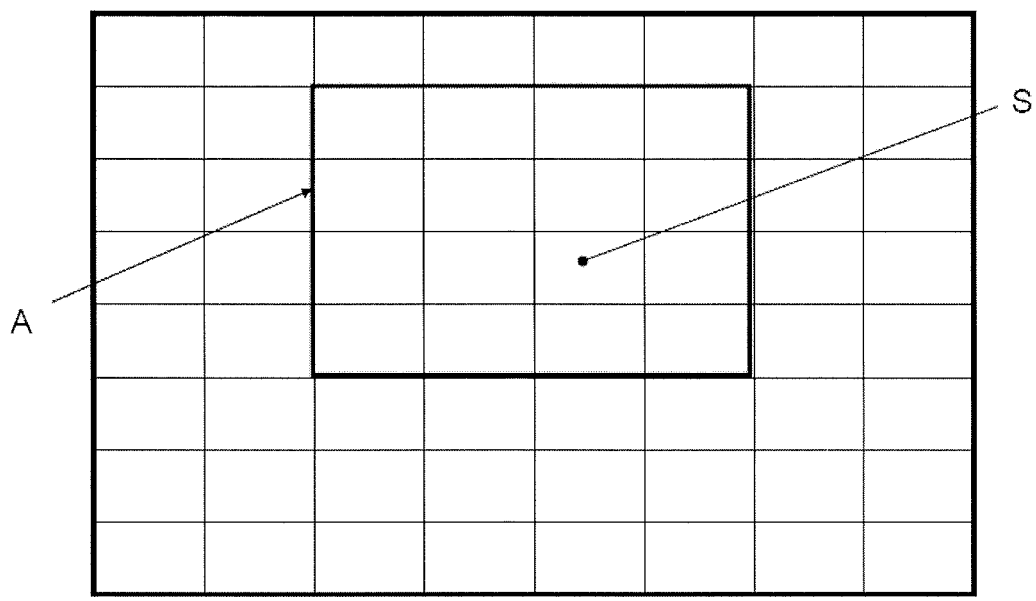
Figure 5:
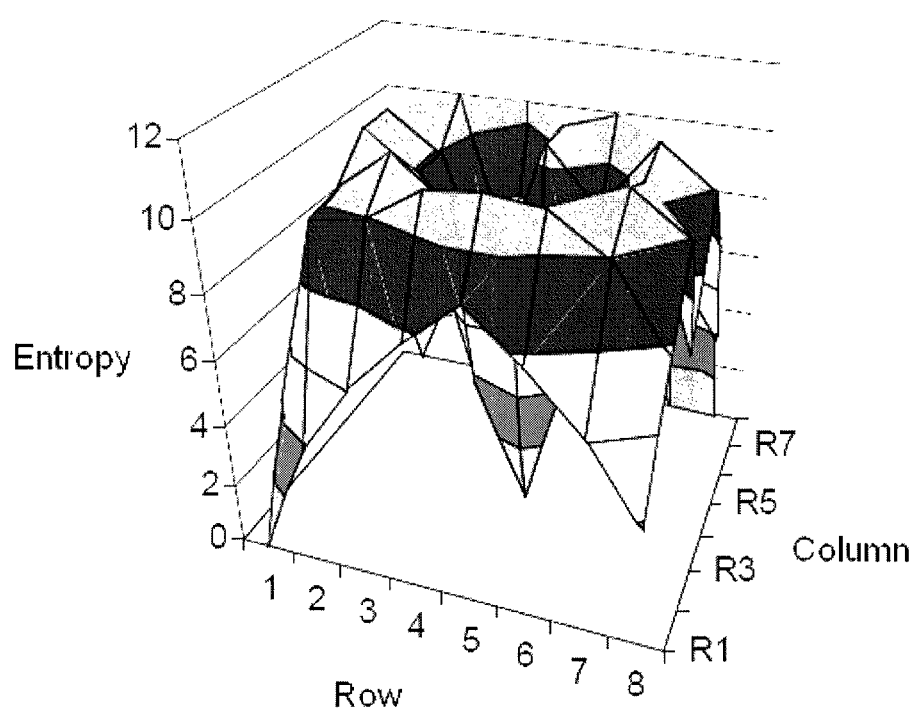

FIG. 1 shows characteristics of a recorded image having hue values of individual pixels, FIG. 2 shows pixels defined as object pixels and background pixels for the recorded image having the characteristics of FIG. 1, FIG. 3 shows an exemplary evaluation window from a recorded image, FIG. 4 shows the corresponding entropy values, calculated with an evaluation window according to FIG. 3, for the pixels of FIG. 2, and FIG. 5 shows an exemplary three-dimensional diagram of a classified object with an entropy funnel.

DETAILED DESCRIPTION OF THE INVENTION

With the method according to the invention, the image recorded is converted to a false color image in a first step. The recorded image may thus be considered as a pixel area from a predefinable number of lines and columns.

In this false color image, a hue value from the HSV color space is then assigned to each pixel, where the hue value corresponds to a hue angle H on a predetermined color circle. Those skilled in the art are familiar with the representation of an HSV color space from http://de.wikipedia.org/wiki/HSV-Farbraum, for example. FIG. 1 shows a detail of a recorded image, in which the individual pixels have been assigned hue values. For ease of representation, the color gradations such as those known from a false color image have not been depicted here.

In a next step, the individual pixels are classified as object pixels and as background pixels. The pixels with hue values within a predetermined value range are defined as object pixels. Pixels whose hue values outside of this value range are defined as background pixels. The predetermined value range is obtained here from a database which is trained onto the objects to be located with regard to their hues.

FIG. 2 shows the detail known from FIG. 1 with the pixels identified as object pixels. As an example, FIG. 2 shows pixels defined as object pixels as having a hue value of (189±10)°. This classification then corresponds to a certain object, by contrast, an excavation in the ground filled with water. An excavation in the ground filled with oil, for example, would be classified with hue values between (151±10)° for example.

In the next process step, an entropy profile for the classified image shown in FIG. 2 is determined, the entropy of mixing S being calculated from the pixel type (object pixel or background pixel) for each pixel.

The theoretical background of the method will be discussed here briefly and explained briefly on the basis of the Boltzmann definition of entropy: a pixel distribution of n pixels with $n_A$ object pixels and $n_B$ background pixels shall be considered. The starting point is the Boltzmann definition of entropy $$S = k \ln \Omega \quad (1)$$

where k is the Boltzmann factor and $\Omega$ is the number of possible arrangements of the $n_A$ object pixels and $n_B$ background pixels.

The number of different implementation options for arranging the $n_A$ object pixels and $n_B$ background pixels in a grid is the number being sought. The number of possibilities of distributing $n_A$ indistinguishable object pixels and $n_B$ background pixels among n sites is given by $$\Omega = \frac{n!}{n_A! n_B!} \quad (2)$$

Inserting equation (2) into equation (1) and applying the Sterling formula $\ln n! \approx n \ln n - n$ yields the entropy of mixing $$S = \Delta S_{mix} = -k\left(n_A \ln \frac{n_A}{n_A + n_B} + n_B \ln \frac{n_B}{n_A + n_B}\right) \quad (3)$$

Entropy is given in arbitrary units. The proportionality factor (Boltzmann constant) is expediently equated to one.

In an advantageous embodiment of the invention, an evaluation window with a predefinable length and width is defined, where the size of the evaluation window expediently coordinated with the expected object size. FIG. 3 shows a 4×4 pixel evaluation window as an example. The entropy of mixing according to equation (3) is advantageously calculated locally inside the evaluation window A, where $n_A$ indicates the number of object pixels, and $n_B$ indicates the number of background pixels within the evaluation window. The entropy of mixing calculated from equation (3) is assigned to the pixel which forms the main pixel of the evaluation window A. In the case depicted in FIG. 3, for example, the pixel S, whose left upper corner forms the center point of the evaluation window A, is defined as the main pixel. Of course, any other pixel with a corner at the center point may also be used as the main pixel.

In another advantageous process step, the evaluation window A is shifted by at least one pixel in the direction of the length and/or width of the evaluation window A. The entropy of mixing according to equation (3) is calculated again at this new position and assigned to the respective main pixel. These process steps are repeated until an entropy value has been assigned to each pixel of the recorded image to be analyzed. FIG. 4 shows the local entropy values in a detail according to FIG. 2 for the exemplary case of an evaluation window 4×4 pixels in size according to FIG. 3.

In the successive calculation of the entropy of mixing, the value zero is obtained wherever there is only one type of pixel, i.e., with the evaluation window entirely outside of the object being sought or entirely inside of same. Values different from zero are obtained wherever at least one pixel of each sort (object pixel or background pixel) is contained in the evaluation window. This yields an entropy profile. FIG. 5 shows the three-dimensional representation of the entropy distribution from FIG. 4. The entropy profile shows a height profile of the entropy over a pixel area. In the present example, an entropy minimum develops in the area of column 4 and row 5. The profile shows a type of entropy funnel at this location. This entropy funnel develops because the size of the evaluation window is smaller than the actual size of the object being sought. As already explained above, the entropy is calculated as being zero when only pixels of one type, namely object pixels here, are present within the evaluation window. The tip of the entropy funnel marks the object main point of the object thus found.

According to the invention a differentiation of the entropy profile with a subsequent extreme value consideration is performed. This makes it possible to determine an object edge curve. With this object edge curve, the highest entropy differences are to be found where the number of object pixels and the number of background pixels in the evaluation window were the same in the entropy value calculation according to equation (3). If the crest (extreme values) of the entropy height profile is projected onto the image recorded, this yields a measure of the size of the object.

Using the method according to the invention, it is possible to reliably differentiate objects with blurred colors with and without fixed contours from one another and to classify them. This method is particularly recommended for high-resolution four-color multispectral cameras, omitting the blue component (false color camera). The proposed method is real-time capable and can be transferred to moving images for the purpose of target tracking. Another advantage of this method is that even camouflaged targets can be discovered.

The invention claimed is:

1. A method for determining object edge curves in a recorded image of a multispectral camera comprising:
converting the image recorded into a false color image,
assigning a hue value from a HSV color space to each pixel in the false color image, such that the hue value corresponds to a hue angle on a predetermined color circle,
classifying the pixels as object pixels and background pixels, such that pixels with hue values that are within a predetermined value range are defined as the object pixels,
determining an entropy profile, by way of a displaceable evaluation window, such that the entropy of mixing S is calculated for each pixel in the recorded image from the object pixels and background pixels according to the equation $$S = -k\left(n_A \ln \frac{n_A}{n_A + n_B} + n_B \ln \frac{n_B}{n_A + n_B}\right)$$

where $n_A$ denotes the number of object pixels within the evaluation window, $n_B$ denotes the number of background pixels within the evaluation window and k is a proportionality factor, considering both differentiation and at least one extreme value of the entropy profile.

2. The method according to claim 1, wherein, for determining the entropy profile, the entropy of mixing is calculated in an evaluation window of a predefinable length and width, such that the evaluation window is displaceable via the pixel classification created and the calculated entropy of mixing S assigned to the respective main pixel of the evaluation window, and further comprising shifting the evaluation window by at least one pixel in a direction of length, width, or both length and width, and repeatedly determining the entropy profile until an entropy of mixing has been assigned to each pixel.

* * * * *